United States Patent
Harding et al.

(10) Patent No.: US 10,773,336 B2
(45) Date of Patent: Sep. 15, 2020

(54) IMAGING DEVICES FOR USE WITH ADDITIVE MANUFACTURING SYSTEMS AND METHODS OF MONITORING AND INSPECTING ADDITIVE MANUFACTURING COMPONENTS

(71) Applicant: General Electric Company, Schenectady, NY (US)

(72) Inventors: Kevin George Harding, Niskayuna, NY (US); William Robert Ross, Rotterdam, NY (US); Bryon Edward Knight, Ballston Lake, NY (US); Venkata Vijayaraghava Nalladega, Watervliet, NY (US); Clifford Bueno, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 15/867,112

(22) Filed: Jan. 10, 2018

(65) Prior Publication Data
US 2018/0193947 A1 Jul. 12, 2018

Related U.S. Application Data

(60) Provisional application No. 62/445,064, filed on Jan. 11, 2017.

(51) Int. Cl.
| | | |
|---|---|---|
| *B23K 26/03* | (2006.01) | |
| *G01N 23/04* | (2018.01) | |
| *B33Y 40/00* | (2020.01) | |
| *B23K 26/342* | (2014.01) | |
| *B33Y 50/02* | (2015.01) | |

(Continued)

(52) U.S. Cl.
CPC .......... *B23K 26/032* (2013.01); *B22F 3/1055* (2013.01); *B23K 26/342* (2015.10); *B33Y 40/00* (2014.12); *B33Y 50/02* (2014.12); *G01N 23/04* (2013.01); *G01N 23/203* (2013.01); *G05B 19/4099* (2013.01); *B22F 2003/1056* (2013.01); *B22F 2003/1057* (2013.01);
(Continued)

(58) Field of Classification Search
CPC .................................................. B23K 26/032
USPC ....................................................... 219/76.1
See application file for complete search history.

(56) References Cited

U.S. PATENT DOCUMENTS

| | | | |
|---|---|---|---|
| 7,553,670 B2 | 6/2009 | Rakow et al. | |
| 8,784,721 B2 | 7/2014 | Philippi et al. | |

(Continued)

FOREIGN PATENT DOCUMENTS

| | | |
|---|---|---|
| CN | 106168518 A | 11/2016 |
| WO | 2007/147221 A1 | 12/2007 |
| WO | 2015120047 A1 | 8/2015 |

OTHER PUBLICATIONS

International Search Report and Written Opinion issued in connection with corresponding PCT Application No. PCT/US2018/013374 dated May 3, 2018.

(Continued)

*Primary Examiner* — Lori L Baker
(74) *Attorney, Agent, or Firm* — Armstrong Teasdale LLP

(57) ABSTRACT

An additive manufacturing system includes at least one imaging device configured to direct electromagnetic radiation towards a build layer of a component positioned within a powder bed of the additive manufacturing system. The additive manufacturing system also includes at least one detector configured to detect the electromagnetic radiation that reflects from the build layer.

23 Claims, 5 Drawing Sheets

(51) Int. Cl.
*B22F 3/105* (2006.01)
*G01N 23/203* (2006.01)
*G05B 19/4099* (2006.01)
*B33Y 10/00* (2015.01)
*B33Y 30/00* (2015.01)

(52) U.S. Cl.
CPC ........... *B22F 2203/11* (2013.01); *B33Y 10/00* (2014.12); *B33Y 30/00* (2014.12)

(56) References Cited

U.S. PATENT DOCUMENTS

| | | |
|---|---|---|
| 2014/0163717 A1 | 6/2014 | Das et al. |
| 2014/0308153 A1 | 10/2014 | Ljungblad |
| 2015/0375456 A1 | 12/2015 | Cheverton et al. |
| 2016/0018320 A1 | 1/2016 | Hess et al. |
| 2016/0091388 A1 | 3/2016 | De Baere |
| 2016/0098824 A1 | 4/2016 | Fry et al. |
| 2016/0144452 A1 | 5/2016 | Liou et al. |
| 2016/0169821 A1 | 6/2016 | Meyer et al. |
| 2016/0199911 A1 | 7/2016 | Dave et al. |
| 2016/0236279 A1 | 8/2016 | Ashton et al. |

OTHER PUBLICATIONS

Schwerdtfeger et al., "In situ flaw detection by IR-imaging during electron beam melting", Rapid Prototyping Journal, vol. 18, Issue: 4, pp. 259-263, Jun. 2012.

Nouri et al., "Structural imperfections in additive manufacturing perceived from the X-ray micro-tomography perspective", Journal of Materials Processing Technology, vol. 234, pp. 113-124, Aug. 2016.

IMAGING DEVICES FOR USE WITH ADDITIVE MANUFACTURING SYSTEMS AND METHODS OF MONITORING AND INSPECTING ADDITIVE MANUFACTURING COMPONENTS

CROSS REFERENCE TO RELATED APPLICATIONS

This application claims priority to U.S. provisional patent application Ser. No. 62/445,064, filed Jan. 11, 2017, which is hereby incorporated by reference in its entirety.

BACKGROUND

The field of the disclosure relates generally to additive manufacturing systems and, more specifically, to imaging devices for use with additive manufacturing systems and methods of monitoring and inspecting additive manufacturing components.

Additive manufacturing systems and processes are used to fabricate precision three-dimensional components from a digital model. Such components are fabricated using an additive process, where successive layers of material are solidified one on top of the other. At least some known additive manufacturing systems use a laser (or similar energy sources) and a series of lenses and mirrors to direct the laser over a powdered material in a pattern provided by a digital material. Some known additive manufacturing systems include Direct Metal Laser Melting (DMLM), Selective Laser Sintering (SLS), Direct Metal Laser Sintering (DMLS), Selective Laser Melting (SLM) and LaserCusing systems.

In some known additive manufacturing systems, layer and component quality is reduced due to variation in heat being transferred to the metal powder by the focused laser within the melt pool. For example, sometimes undesirable features such as air pockets, internal voids, and/or cracking occur within and/or between build layers. In addition, in some known additive manufacturing systems, heat variation also induces porosity within the build layers. Moreover, variation in laser position is also known to generate these undesirable features within the additively manufactured component.

At least some known additive manufacturing systems include imaging devices that generate images of portions of the melt pool during the fabrication process. The imaging devices typically include a static camera with low exposure that tracks the focused laser to capture light during the melting process. However, the imaging devices generate images of only visible portions of the component and thus do not capture subsurface features. Other known component inspection techniques include ultrasound and x-ray imaging. However, ultrasound imaging requires that the component be finished, thus further expending time and materials costs for a potentially undesirable part. Additionally, x-ray imaging is typically performed by a digital x-ray or Computer Tomography (CT) scans which are limited by the size of the component and also requires a large amount of x-ray energy to penetrate the entire component. When undesirable features are located, at least some known processes, such as Hot Isostatic Pressing (HIP), attempt to cure the features by re-heating the completed component under pressure. However, not all features, for example, cracking features, are correctable by HIP.

BRIEF DESCRIPTION

In one aspect, an additive manufacturing system is provided. The additive manufacturing system includes at least one imaging device configured to direct electromagnetic radiation towards a build layer of a component positioned within a powder bed of the additive manufacturing system. The additive manufacturing system also includes at least one detector configured to detect the electromagnetic radiation that reflects from the build layer.

In another aspect, a method of monitoring a component manufactured in an additive manufacturing system is provided. The method includes directing electromagnetic radiation from at least one imaging device towards a build layer of the component positioned within a powder bed of the additive manufacturing system. The method also includes detecting by at least one detector the electromagnetic radiation reflecting from the build layer.

In still another aspect, an imaging device for an additive manufacturing system is provided. The imaging device includes a flash infrared camera configured to image infrared radiation from a build layer of a component positioned within a powder bed of the additive manufacturing system, wherein a reflection of the infrared radiation identifies an internal insulating feature defined within the build layer.

In a further aspect, a method of monitoring a component manufactured in an additive manufacturing system is provided. The method includes directing infrared radiation towards a build layer of the component positioned within a powder bed of the additive manufacturing system. The method also includes detecting by a flash infrared camera a reflection of the infrared radiation within the build layer.

In yet another aspect, a x-ray system for use with additively manufactured components is provided. The x-ray system includes at least one imaging device configured to direct electromagnetic radiation towards the component. The at least one imaging device is positionable about the component. The x-ray system also includes at least one detector configured to detect the electromagnetic radiation directed from the at least one imaging device. The at least one detector is positionable about the component and corresponding to a position of the at least one imaging device such that a localized predetermined area of the component is imaged.

In yet a further aspect, a method of inspecting a component manufactured in an additive manufacturing system is provided. The method includes positioning a x-ray system adjacent to the component such that a localized predetermined area of the component is imaged, wherein the x-ray system includes at least one imaging device and at least one detector. The method also includes directing electromagnetic radiation from the at least one imaging device towards the component. The method further includes detecting by the at least one detector the electromagnetic radiation from the at least one imaging device.

DRAWINGS

These and other features, aspects, and advantages of the present disclosure will become better understood when the following detailed description is read with reference to the accompanying drawings in which like characters represent like parts throughout the drawings, wherein.

Figure 1:
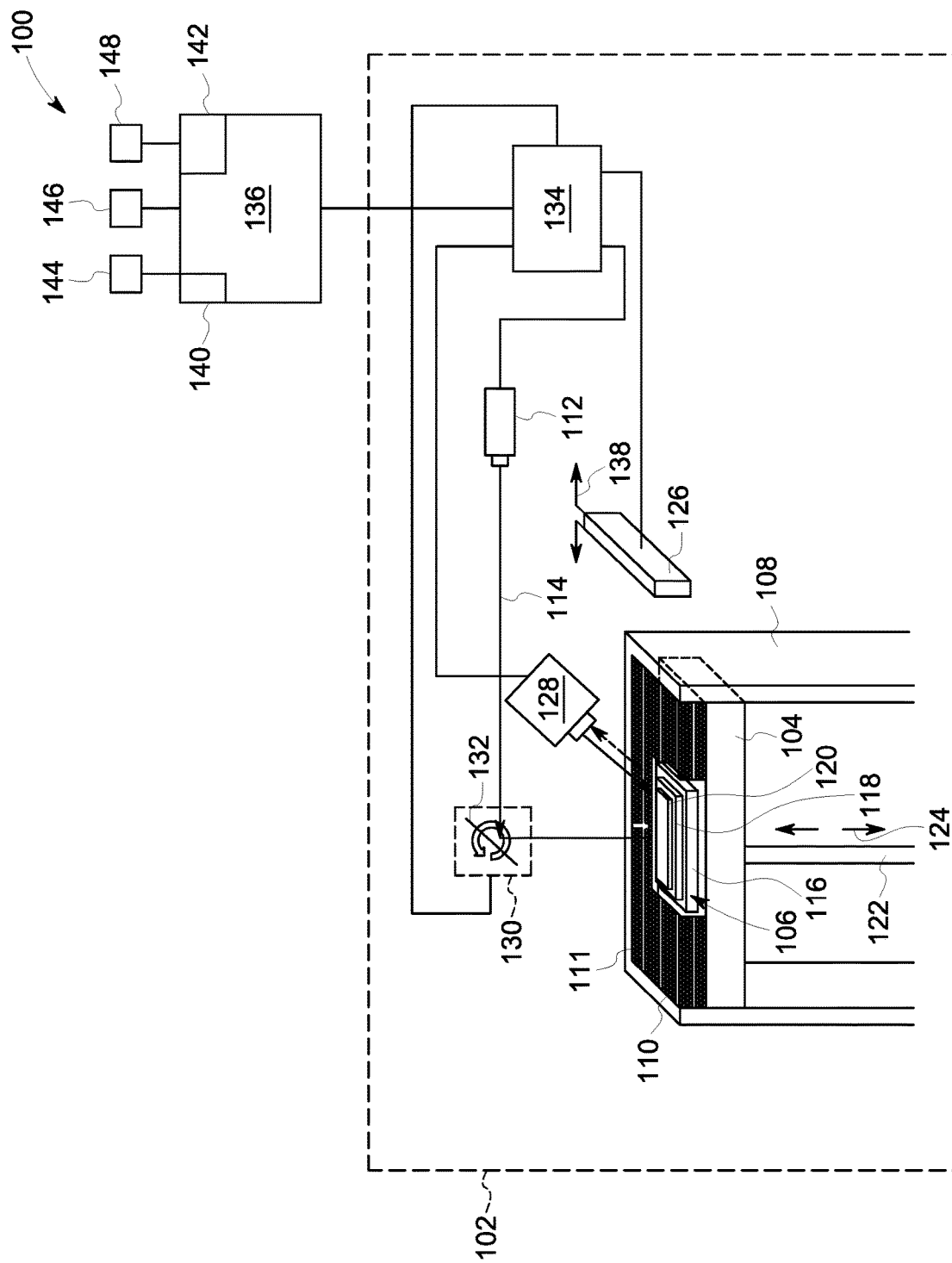
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of imaging devices for additive manufacturing systems, as described herein, overcome a number of deficiencies of known imaging systems and provide a cost-effective method for identifying undesirable features during the additive manufacturing process. Specifically, the embodiments described herein replace known imaging systems that image only a surface of a component build layer. This leads to undesirable subsurface features not being detected until after the additive manufacturing process is completed. More specifically, a first exemplary imaging device includes an x-ray device that images the component build layer through use of x-rays. The x-rays are reflected off of the component build layer and imaged through a detector as backscatter. Through use of x-rays, undesirable subsurface features such as voids, cracks, and porosity are identified. By identifying these subsurface features early in the additive manufacturing process, the manufacturing process can be adjusted to fix the features and/or allow for early detection of an unusable component, thereby increasing manufacturing efficiencies. Additionally, through use of x-ray backscatter imaging, x-ray energy is reduced because the x-rays are not required to travel through the entire component and additive manufacturing system.

Additionally, a second exemplary imaging device includes a flash infrared detection camera that images infrared radiation of the component build layer. Infrared radiation is directed into the component build layer and undesirable subsurface insulating features such as air pockets, voids, and cracks are identified. By identifying these subsurface features early in the additive manufacturing process, the manufacturing process can be changed to fix the features and/or allow for early detection of an unusable component, thereby increasing manufacturing efficiencies. Additionally, the flash infrared detection process is a quick process that occurs between build layer formation and placement of the next build material layer.

Additionally, embodiments of x-ray imaging systems for use with additive manufacturing component, as described herein, overcome a number of deficiencies of known imaging systems and provide a cost-effective method for identifying undesirable features during the additive manufacturing process. Specifically, the embodiments described herein replace known imaging systems such as computer tomography scan systems and digital x-ray systems that are limited as to the size of the component that may fit within the scanning system. Additionally, the embodiments described herein replace ultrasound imaging systems that require the component surface to be finished. These known systems lead to undesirable subsurface features not being detected for large components or not being detected until after the component is finished. More specifically, the exemplary imaging systems described herein include an x-ray device that images a localized predetermined area of the component through use of x-rays. The x-rays are directed through the localized area and imaged using a detector. In some embodiments, these images are combined to form a complete representation of the component. Through use of the x-ray system, undesirable subsurface features such as voids, cracks, and porosity are identified for large additive manufactured components. As such, high energy x-ray sources that penetrate through the entire component are not needed. Additionally, the size of the component does not determine what imaging technique to use as the imaging system size is not a factor. Moreover, the surface of component does not need to be finished before imaging, thereby decreasing manufacturing costs for undesirable components.

FIG. 1 is a schematic illustration of an exemplary additive manufacturing system 100 including an additive manufacturing device 102. In the exemplary embodiment, additive manufacturing system 100 is a direct metal laser melting (DMLM) system. Although the embodiments herein are described with reference to DMLM systems, this disclosure may also apply to other types of additive manufacturing systems, such as liquid-resin based additive manufacturing systems (e.g., stereolithograpy systems) or selective laser melting systems.

Additive manufacturing device 102 includes a build platform 104 for supporting a three-dimensional component 106 during the additive manufacturing process, a reservoir 108 of build material 110, also known as a powder bed 111, and an energy source 112 that emits an energy beam 114 for sintering, curing, hardening, or otherwise solidifying a portion of powder bed 111 to form a plurality of superposed build layers 116, 118, and 120 that form component 106. A front wall of reservoir 108 is omitted in FIG. 1 for clarity. Similarly, portions of powder bed 111 are omitted in FIG. 1 for clarity. In the exemplary embodiment, three-dimensional component 106 is an aircraft component, although additive manufacturing system 100 may be used to fabricate any three-dimensional component. Build platform 104 is coupled to vertical adjuster 122 such that build platform may be raised and/or lowered along a vertical direction 124 to adjust the plane in which powder bed 111 is to be solidified.

In the exemplary embodiment, energy source 112 is a laser. More specifically, energy source 112 is a fiber laser or a diode laser. In alternative embodiments, energy source 112 may be any suitable energy source for sintering, curing, hardening, or otherwise solidifying powder bed 111, such as, for example, an ultraviolet laser, light source, gas laser, such as a carbon dioxide ($CO_2$) laser, or electron beam generator. In alternative embodiments, additive manufacturing system 100 includes two or more energy sources 112 that have similar power or different power that enables additive manufacturing system 100 to function as described herein. Further, in the exemplary embodiment, build material 110 is a metallic powder. More specifically, build material 110 is a gas atomized metal powder (e.g., cobalt, iron, aluminum, titanium and/or nickel alloys) having a mean particle size within a range of between approximately 10 and 100 microns.

Additive manufacturing device 102 also includes a build material dispenser, also known as a re-coater assembly 126, for providing a thin layer of build material 110 over powder bed 111 and a previously formed build layer. Additionally, additive manufacturing device 102 includes an imaging device 128 positioned with a field of view of component 106. Imaging device 128 records and/or stores data (e.g., images) associated with layers 116, 118, and 120 and/or component 106 both during a build process and after a build process has been completed. Imaging device 128 is discussed in further detail below in reference to FIGS. 2-5. In the exemplary embodiment, additive manufacturing device 102 includes a scanning device 130 for scanning energy beam 114 over selective portions of powder bed 111. In the exemplary embodiment, scanning device 130 includes one or more galvanometer optical scanners 132 and/or one or more motorized mirrors, lenses and/or other optical devices.

One or more of build platform 104, re-coater 126, imaging device 128, scanning device 130, and energy source 112, are operatively coupled in communication to a controller 134. In the exemplary embodiment, re-coater 126, imaging device 128, scanning device 130, and energy source 112, are operatively coupled to controller 134. Also, in the exemplary embodiment, controller 134 is operatively coupled in communication with a computing device 136.

In operation, additive manufacturing system 100 fabricates component 106 by a layer-by-layer manufacturing process. More specifically, component 106 is fabricated from an electronic representation of the three-dimensional geometry of component 106 stored on computing device 136. For example, the electronic representation is produced in a computer aided design (CAD) or similar electronic file. In alternative embodiments, the electronic representation is any electronic representation that enables additive manufacturing system 100 to operate as described herein. In the exemplary embodiment, the CAD file representing component 106 is converted, for example, by computing device 136, into a layer-by-layer format that includes a plurality of build parameters of each layer. Component 106 is arranged electronically in a desired orientation relative to the origin of the coordinate system used in additive manufacturing system 100. Additionally, the geometry of component 106 is sliced into a stack of two-dimensional layers of a desired thickness, such that the geometry of each layer is an outline of the cross-section through component 106 at that particular layer location. A hatch pattern is generated within each respective layer such that the build parameters are applied along the hatch pattern to fabricate that layer of component 106 from build material 110 and constructing a plan to build component 106. The steps are repeated for each respective layer. Once the process is completed, an electronic computer build file (or files) is generated including all of the layers.

After the build file is generated, additive manufacturing system 100 is operated to manufacture component 106 by implementing the layer-by-layer manufacturing process plan that is constructed. The exemplary layer-by-layer manufacturing process does not use a pre-existing article as the precursor to the final component, rather the process produces component 106 from a raw material in a configurable form, such as the powdered build material 110. For example, and without limitation, a steel alloy material is additively manufactured using a steel alloy powder. Additive manufacturing system 100 enables fabrication of components using a broad range of materials, for example, metals, ceramics, and polymers.

As used herein, the term "parameter" refers to characteristics that are used to define the operating conditions of additive manufacturing system 100, such as a power output of energy source 112, a vector scanning speed of energy source 112, a raster power output of energy source 112, a raster scanning speed of energy source 112, a raster tool path of energy source 112, and a contour power output of energy source 112 within additive manufacturing system 100. In some embodiments, the parameters are initially input by a user into computing device 136. The parameters represent a given operating state of additive manufacturing system 100. In general, during raster scanning, energy beam 114 is scanned sequentially along a series of substantially straight hatch lines spaced apart and parallel to each other. During vector scanning, energy beam 114 is generally scanned sequentially along a series of substantially straight hatch lines or vectors, wherein the orientation of the vectors relative to each other sometimes varies. In general, the ending point of one vector coincides with the beginning point of the next vector. Vector scanning is generally used to define the outer contours of a component, whereas raster scanning is generally used to "fill" the spaces enclosed by the contour, where component 106 is solid.

During operation of additive manufacturing system 100, re-coater 126 is positioned adjacent to build platform 104. As re-coater 126 moves along direction 138, re-coater 126 deposits a layer of build material 110 on build platform forming powder bed 111. After a new layer of build material 110 is deposited, energy source 112 channels energy beam 114 through scanning device 130 that directs energy beam 114 over selective portions of powder bed 111. For example, galvanometer 132 of scanning device 130 directs energy beam 114 over selective portions of powder bed 111 forming a new build layer, such as layer 120, of component 106. For the next layer, build platform 104 through vertical adjuster 122 moves powder bed 111 downward along direction 124 such that re-coater 126 can make another pass along powder bed 111 to deposit another layer of build material 110 and to facilitate forming another build layer of component 106. This process is then repeated for a plurality of layers, for example, layers 116, 118, and 120, to form component 106. During and/or after each build layer, imaging device 128 is used to record and/or store data images of the recent build layer that are then compared to the electronic computer build files to verify the manufacturing process. Imaging device 128 is discussed in further detail below in reference to FIGS. 2-5.

In the exemplary embodiment, build platform 104, energy source 112, re-coater 126, imaging device 128, and scanning device 130 are operatively controlled by controller 134. Controller 134 is any controller typically provided by a manufacturer of additive manufacturing system 100 to control operation thereof. Controller 134 is operatively coupled to computing device 136. In alternative embodiments, controller 134 is a computer system that includes at least one processor and at least one memory device.

Computing device 136 includes at least one memory device 140 and at least one processor 142 coupled to memory device 140. In some embodiments, processor 142 includes one or more processing units, such as, without limitation, a multi-core configuration. In the exemplary embodiment, processor 142 includes a field programmable gate array (FPGA). Alternatively, processor 142 is any type of processor that permits computing device 136 to operate as described herein. In some embodiments, executable instructions are stored in memory device 140. Computing device 136 is configurable to perform one or more operations described herein by programming processor 142. For example, processor 142 is programmed by encoding an operation as one or more executable instructions and providing the executable instructions in memory device 140. In the exemplary embodiment, memory device 140 is one or more devices that enable storage and retrieval of information such as executable instructions or other data. In some embodiments, memory device 140 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In the exemplary embodiment, memory device 140 is configured to store build parameters including, without limitation, real-time and historical build parameter values, or any other type of data. In the exemplary embodiment, memory device 140 stores images generated by imaging device 128. In alternative embodiments, memory device 140 stores any data that enable additive manufacturing system 100 to operate as described herein. In some embodiments, processor 142 removes or "purges" data from memory device 140 based on the age of the data. For example, processor 142 overwrites previously recorded and stored data associated with a subsequent time or event. In addition, or alternatively, processor 142 removes data that exceeds a predetermined time interval. In addition, memory device 140 includes, without limitation, sufficient data, algorithms, and commands to facilitate monitoring and measuring of build parameters and the geometric conditions of component 106 fabricated by additive manufacturing system 100.

Computing device 136 also includes a presentation interface 144 coupled to processor 142. Presentation interface 144 presents information, such as images generated by imaging device 128, to a user. In one embodiment, presentation interface 144 includes a display adapter (not shown) coupled to a display device (not shown), such as a cathode ray tube (CRT), a liquid crystal display (LCD), an organic LED (OLED) display, or an "electronic ink" display. In some embodiments, presentation interface 144 includes one or more display devices. In addition, or alternatively, presentation interface 144 includes an audio output device (not shown), for example, without limitation, an audio adapter or a speaker (not shown).

In the exemplary embodiment, computing device 136 includes a user input interface 146. In the exemplary embodiment, user input interface 146 is coupled to processor 142 and receives input from the user. In some embodiments, user input interface 146 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 144 and user input interface 146.

A communication interface 148 is coupled to processor 142 and is configured to be coupled in communication with one or more other devices, such as controller 134, and to perform input and output operations with respect to such devices while performing as an input channel. For example, in some embodiments, communication interface 148 includes, without limitation, a wired network adapter, a wireless network adapter, a mobile telecommunications adapter, a serial communication adapter, or a parallel communication adapter. Communication interface 148 receives a data signal from or transmits a data signal to one or more remote devices.

Presentation interface 144 and communication interface 148 are both capable of providing information suitable for use with the methods described herein, such as, providing information to the user or processor 142. Accordingly, presentation interface 144 and communication interface 148 are referred to as output devices. Similarly, user input interface 146 and communication interface 148 are capable of receiving information suitable for use with the methods described herein and are referred to as input devices.

Figures 2, 3:
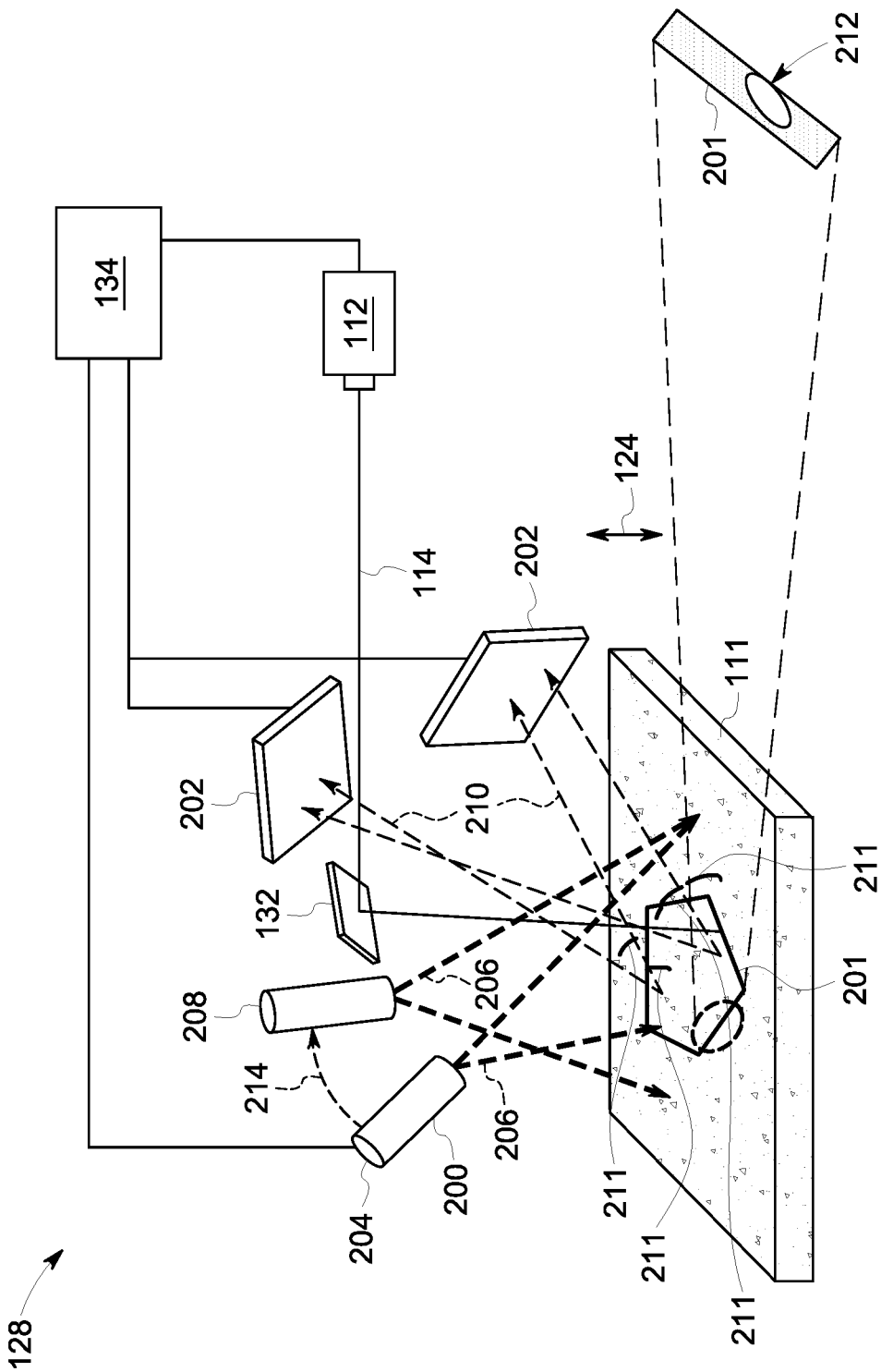
FIG. 2 is a perspective view of an exemplary imaging device that may be used with the additive manufacturing system shown in FIG. 1.
FIG. 3 is an enlarged view of an exemplary build layer shown in FIG. 2.

FIG. 2 is a perspective view of an exemplary imaging device 128 that may be used with additive manufacturing system 100 (shown in FIG. 1). FIG. 3 is an enlarged view of an exemplary build layer 201 that is shown in FIG. 2. Imaging device 128 includes at least one x-ray device 200 and at least one detector 202, each coupled to controller 134 and positioned above build layer 201 and powder bed 111 in vertical direction 124. In the exemplary embodiment, build layer 201 is the next additive layer that is coupled to build layer 120 (shown in FIG. 1) that forms component 106 (also shown in FIG. 1).

In the exemplary embodiment, imaging device 128 includes a single x-ray device 200 that is positionable, by controller 134, within additive manufacturing system 100 (shown in FIG. 1). For example, x-ray device 200 is positioned at a first predetermined position 204 to direct x-rays 206 towards build layer 201 and powder bed 111. Additionally, x-ray device 200 is positionable at a second predetermined position 208 to direct ex-rays 206 towards build layer 201 and powder bed 111. In alternative embodiments, imaging device 128 includes a plurality of x-ray devices 200 positioned with additive manufacturing system 100.

In the exemplary embodiment, imaging device 128 also includes a plurality of detectors 202 positioned at stationary locations within additive manufacturing system 100 (shown in FIG. 1). Each detector 202 is a digital x-ray panel that is positioned at a different angle in relation to build layer 201, such that x-ray backscatter 210 is received and detected from multiple reflection angles 211. In alternative embodiments, imaging device 128 includes a plurality of detectors 202 that are positionable, by controller 134, within additive manufacturing system 100.

In operation, energy beam 114 is scanned over a portion of powder bed 111 forming the most recent build layer 201 that is part of component 106. However, variation in energy beam position and power are known to form an undesirable subsurface feature 212 within build layer 201. For example, feature 212 includes, but is not limited to, a void defined within build layer 201 and/or between build layers, a crack defined within build layer 201 and/or between build layers, and/or porosity within build layer 201. As such, after energy beam 114 forms at least a portion of build layer 201, x-ray device 200 directs electromagnetic radiation, such as x-rays 206, towards build layer 201. In the exemplary embodiment, x-ray device 200 scans 214 between predetermined positions 204 and 208 to capture the entire build layer 201. In alternative embodiments, x-ray device 200 is stationary and captures the entire build layer 201.

X-rays 206 reflect off of build layer 120 and feature 212, and backscatter 210 is detected by detectors 202. Backscatter 210 reflecting off of feature 212 will reflect at different reflection angles, for example reflection angle 211, than backscatter 210 reflecting off of build layer 201, and as such, detectors 202 facilitate detecting the undesirable feature 212. More specifically, multiple detector panels 202 facilitate capturing backscatter 210 at different image angles. For example, feature 212 scatters x-rays 206 at larger angles than build layer 201. These images can then be used to reverse trace the path of backscatter 210 through triangulation, for example, by computing device 136, to create a model of build layer 201 and/or feature 212 reflecting x-rays 206 while accounting for the surrounding powder bed 111. Additionally, through use of multiple detector panels 202 the type, size, and depth of feature 212 is identified and determined. If feature 212 is detected by imaging device 128, energy beam 114 scanned over the next build layer(s) is modified to correct feature 212.

By imaging backscatter 210 of x-rays 206, the energy of x-rays 206 is reduced because x-rays 206 are not required to travel through the entire component 106, powder bed 111, and build platform 104 (shown in FIG. 1). Additionally, the energy of x-rays 206 is further reduced because feature 212 is typically located within build layer 201 to a depth of approximately 100 microns and the x-ray imaging is performed after every build layer, for example build layer 201.

Figures 4, 5:
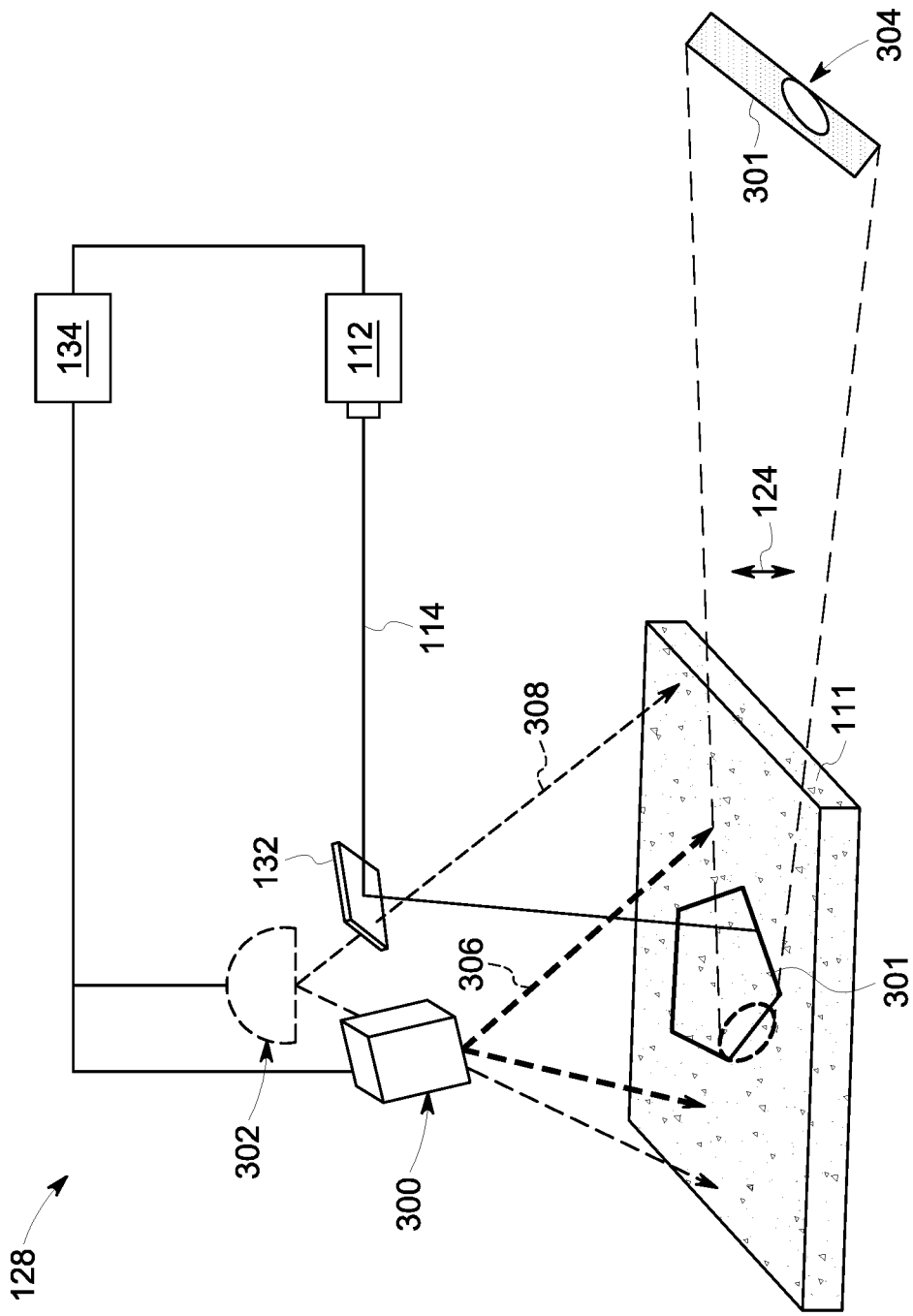
FIG. 4 is a perspective view of an alternative imaging device that may be used with the additive manufacturing system shown in FIG. 1.
FIG. 5 is an enlarged view of an exemplary build layer shown in FIG. 4.

FIG. 4 is a perspective view of an alternative imaging device 128 that may be used with additive manufacturing system 100 (shown in FIG. 1). FIG. 5 is an enlarged view of an exemplary build layer 301 that is shown in FIG. 4. Imaging device 128 includes a flash infrared camera 300 and a flash lamp 302, each coupled to controller 134 and positioned above build layer 301 and powder bed 111 in vertical direction 124. In this embodiment, build layer 301 is the next additive layer that is coupled to build layer 120 (shown in FIG. 1) that forms component 106 (also shown in FIG. 1). Infrared camera 300 includes a fast infrared camera for flash infrared detection and flash lamp 302 or any other heating element is a fast heat source that flashed infrared radiation. In this embodiment, infrared camera 300 and flash lamp 302 are each static such that the entire build layer 301 is within a field of view. In alternative embodiments, infrared camera 300 and flash lamp 302 are moveable and positionable through controller 134 within additive manufacturing system 100.

In operation, energy beam 114 is scanned over a portion of powder bed 111 forming the most recent build layer 301 that is part of component 106. However, variation in energy beam position and power are known to form an undesirable subsurface insulating feature 304 within build layer 301. For example, feature 304 includes, but is not limited to, an air pocket defined within build layer 301, a void defined within build layer 301 and/or between build layers, and/or a crack defined within build layer 301 and/or between build layers. As such, in some embodiments, after energy beam 114 forms at least a portion of build layer 301, infrared camera 300 images 306 infrared radiation of build layer 301, with energy source 112 providing infrared radiation for imaging. Infrared radiation propagates through build layer 301 until it reflects off of feature 304 and the return heat is detected and imaged by infrared camera 300. In other embodiments, after energy beam 114 forms at least a portion of build layer 301, flash lamp 302 directs infrared radiation 308 towards build layer 301 for flash infrared imaging.

For flash infrared detection by infrared camera 300, flash lamp 302 is flashed for a millisecond or less. The return heat from feature 304 is detected on the surface of build layer 301 by infrared camera 300. The temperature difference on the build layer surface need only be a few degrees or less to identify feature 304. For example, feature 304 as small as a thousandth of an inch is identifiable, and in only a few seconds. As such, infrared camera 300 facilities imaging build layer 301 before the next layer of build material 110 (shown in FIG. 1) is applied by re-coater 126 (also shown in FIG. 1). If feature 304 is detected by imaging device 128, energy beam 114 scanned over the next build layer(s) is modified to correct feature 304.

Figure 6:
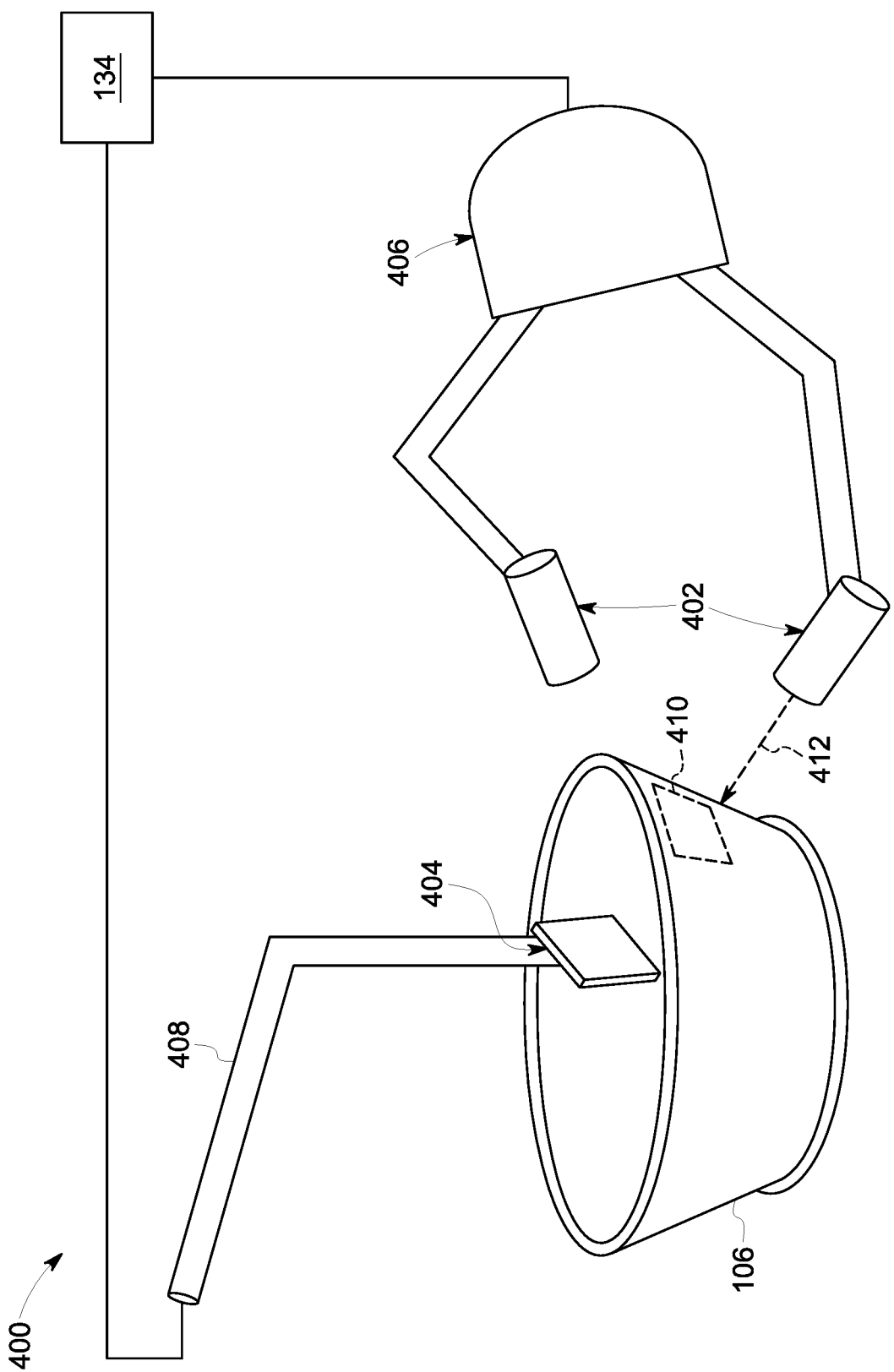
FIG. 6 is a perspective view of an exemplary x-ray system that may be used with the additive manufacturing system shown in FIG. 1.

FIG. 6 is a perspective view of an exemplary x-ray system 400 that may be used with additive manufacturing system 100 (shown in FIG. 1). In the exemplary embodiment, x-ray system 400 includes at least one imaging device 402 and at least one detector 404. Imaging devices 402 are coupled to a positioner 406 that is in communication with controller 134 such that imaging devices 402 are individually positionable around component 106. Detector 404 is coupled to a separate positioner 408 that is in communication with controller 134 such that detector 404 is also individually positionable around component 106 at a corresponding position to imaging devices 402. In the exemplary embodiment, each positioner 406 and 408 is controlled by controller 134 such that component 106 is imaged through x-ray system 400 that is coupled to additive manufacturing system 100. In alternative embodiments, x-ray system 400 includes a separate controller and computing device (not shown) such that x-ray system 400 is modular and may be used with different additive manufacturing systems.

In operation, component 106 is manufactured by additive manufacturing system 100 through the buildup of discrete layers. Once component 106 is formed, component 106 is imaged to verify the manufacturing process. For example, during manufacturing variation in energy beam position and power are known to form undesirable subsurface features within component 106. For example, subsurface voids, cracks, and/or porosity may be defined within component 106. As such, x-ray system 400 facilitates imaging a localized predetermined area 410 of component 106 to inspect for any undesirable subsurface features. In some embodiments, x-ray system 400 generates multiple images of component 106 and combines the images for a complete representation of component 106.

Imaging device 402 directs electromagnetic radiation, such as x-rays 412, towards component 106 and specifically towards localized area 410. X-rays 412 penetrate component 106 and detected by detector 404. For example, detector 404 is a digital x-ray panel that is positioned inside component 106. The x-ray images from detector 404 are used to determine and locate any undesirable subsurface features within localized area 410. By x-ray imaging only localized area 410 the required x-ray energy is lowered because x-rays 412 only are required to penetrate a portion of component 106. Additionally, x-ray imaging may be directed to specific features, such as overhangs and/or edges before further processing component 106.

Figure 7:
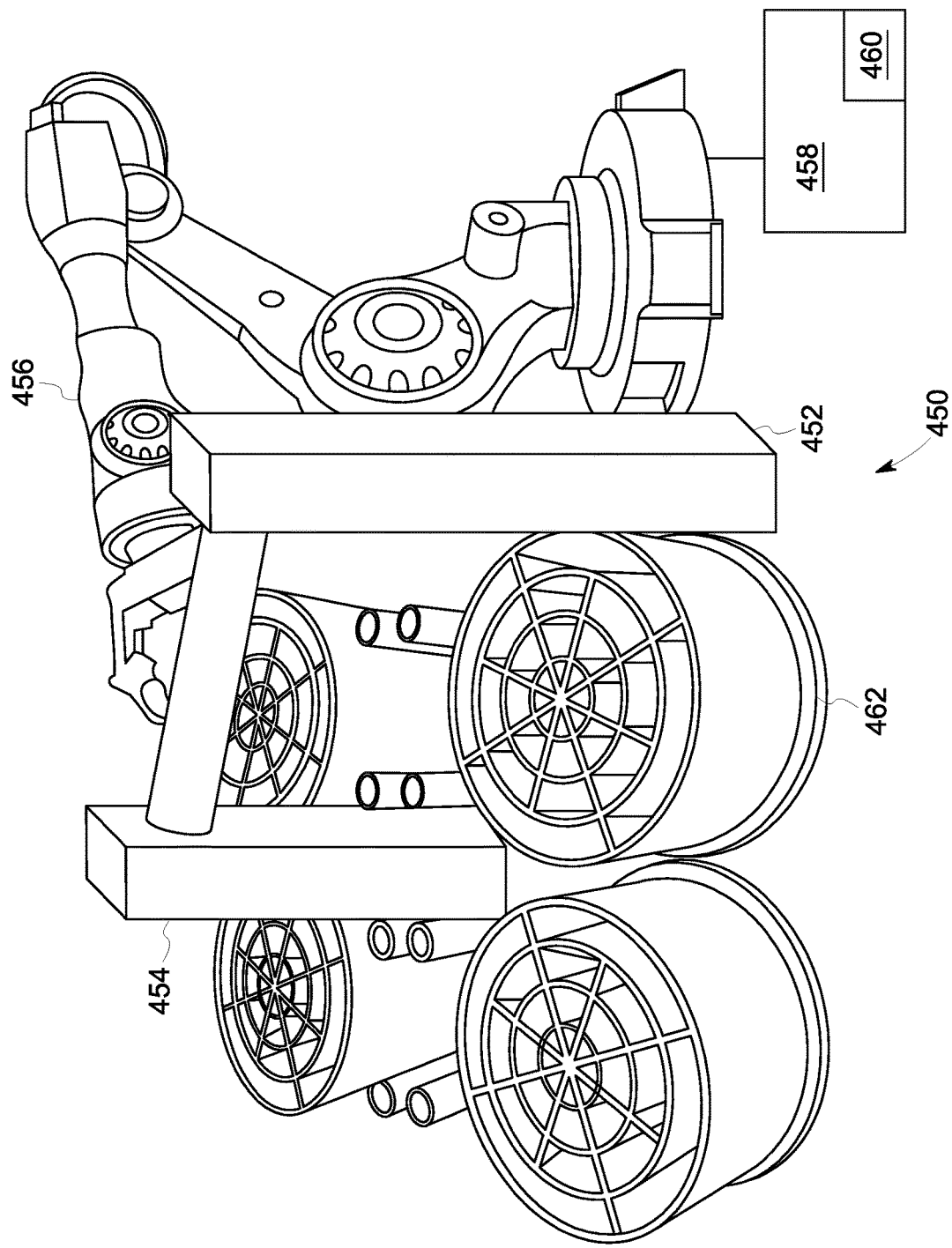
FIG. 7 is a perspective view of an alternative x-ray system that may be used with the additive manufacturing system shown in FIG. 1.

FIG. 7 is a perspective view of an alternative x-ray system 450 that may be used with additive manufacturing system 100 (shown in FIG. 1). Similar to x-ray system 400 (shown in FIG. 6), x-ray system 450 includes an imaging device 452 and a detector 454. In this embodiment, imaging device 452 is coupled to detector 454. Both imaging device 452 and detector 454 are coupled to a positioner 456 at a predetermined distance apart. Positioner 456 is controllable to a computing device 458 including a controller 460 that is separate from additive manufacturing system 100. In alternative embodiments, positioner 456 is coupled to additive manufacturing system 100. Positioner 456 facilitates positioning x-ray system 450 about an additive manufactured component 462, such that a portion of component 462 is imaged. In the exemplary embodiment, positioner 456 includes a robot. However, positioner 456 includes any device that enables alternative x-ray system 450 to operate as described herein.

In operation, component 462 is manufactured by additive manufacturing system 100 through the buildup of discrete layers. Once component 462 is formed, component 462 is imaged to verify the manufacturing process. For example, during manufacturing variation in energy beam position and power are known to form undesirable subsurface features within component 462. For example, subsurface voids, cracks, and/or porosity may be defined within component 462. As such, x-ray system 450 facilitates imaging a localized predetermined area of component 462 to inspect for any undesirable subsurface features.

Imaging device 452 directs electromagnetic radiation, such as x-rays, towards component 462 and specifically towards the localized area. The x-rays penetrate component 462 and detected by detector 454. For example, x-ray system 450 is positioned around a single element of component 462. The x-ray images from detector 454 are used to determine and locate any undesirable subsurface features within the localized area.

The above-described imaging devices for additive manufacturing systems overcome a number of deficiencies of known imaging systems and provide a cost-effective method for identifying undesirable features during the additive manufacturing process. Specifically, the embodiments described herein replace known imaging systems that image only a surface of a component build layer. This leads to undesirable subsurface features not being detected until after the additive manufacturing process is completed. More specifically, one exemplary imaging device describe herein includes an x-ray device that images the component build layer through use of x-rays. The x-rays are reflected off of the component build layer and imaged through a detector as backscatter. Through use of x-rays, undesirable subsurface features such as voids, cracks, and porosity are identified. By identifying these subsurface features early in the additive manufacturing process, the manufacturing process can be changed to fix the features and/or allow for early detection of an unusable component, thereby increasing manufacturing efficiencies. Additionally, through use of x-ray backscatter imaging, x-ray energy is reduced because the x-rays are not required to travel through the entire component and additive manufacturing system.

Additionally, another exemplary imaging device described herein includes a flash infrared detection camera that images infrared radiation of the component build layer. Infrared radiation is directed into the component build layer and undesirable subsurface insulating features such as air pockets, voids, and cracks are identified. By identifying these subsurface features early in the additive manufacturing process, the manufacturing process can be changed to fix the features and/or allow for early detection of an unusable component, thereby increasing manufacturing efficiencies. Additionally, the flash infrared detection process is a quick process that occurs between build layer formation and placement of the next build material layer.

Finally, the above described x-ray imaging systems for use with additive manufacturing component overcome a number of deficiencies of known imaging systems and provide a cost-effective method for identifying undesirable features during the additive manufacturing process. Specifically, the embodiments described herein replace known imaging systems such as computer tomography scan systems and digital x-ray systems that are limited as to the size of the component that may fit within the scanning system. Additionally, the embodiments described herein replace ultrasound imaging systems that require the component surface to be finished. These systems lead to undesirable subsurface features not being detected for large components or until after the component is finished. More specifically, the exemplary imaging systems include an x-ray device that images a localized predetermined area of the component through use of x-rays. The x-rays are directed through the localized area and imaged through a detector. In some embodiments, these images are combined to form a complete representation of the component. Through use of the x-ray system, undesirable subsurface features such as voids, cracks, and porosity are identified for large additive manufactured components. As such, high energy x-ray sources that penetrate through the entire component are not needed. Additionally, the size of the component does not determine what imaging technique to use as the imaging system size is not a factor. Moreover, the surface of component does not need to be finished before imaging thereby decreasing manufacturing costs for undesirable components.

An exemplary technical effect of the methods and systems described herein includes: (a) imaging undesirable subsurface features through a x-ray backscatter system; (b) identifying a location, size, and depth of the features for correction; (c) reducing x-ray energy used in the imaging device by imaging the backscatter; (d) increasing efficiency of the additive manufacturing process through early detection of undesirable features; (e) increasing quality of additive manufacturing components; (f) imaging undesirable subsurface features through a fast infrared detection system; (g) identifying a location of the features for correction; (h) increasing efficiency of the additive manufacturing process through early detection of undesirable features; (i) increasing quality of additive manufacturing components; (j) imaging undesirable subsurface features through a x-ray system that is locally positionable; (k) identifying a location the features; (l) reducing x-ray energy used in the imaging device; (m) increasing efficiency of the additive manufacturing process through early detection of undesirable features; and (n) increasing quality of additive manufacturing components.

Exemplary embodiments of systems and methods for imaging systems for additive manufacturing systems are described above in detail. The methods and systems are not limited to the specific embodiments described herein, but rather, components of systems and/or steps of the methods may be utilized independently and separately from other components and/or steps described herein. For example, the method may also be used in combination with other imaging systems, and are not limited to practice only with the additive manufacturing systems as described herein. Rather, the exemplary embodiments can be implemented and utilized in connection with many other applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An additive manufacturing system comprising:
    at least one imaging device configured to direct electromagnetic radiation towards a build layer of a component positioned within a powder bed of the additive manufacturing system; and
    a plurality of detectors configured to detect the electromagnetic radiation that reflects from the build layer, wherein each detector of said plurality of detectors is positioned at a different stationary location within said additive manufacturing system and at different angles in relation to the build layer.

2. The additive manufacturing system in accordance with claim 1, wherein said at least one imaging device comprises at least one x-ray device and said plurality of detectors are configured to detect backscatter x-rays.

3. The additive manufacturing system in accordance with claim 1, wherein said at least one imaging device and said plurality of detectors are positioned above the build layer and the powder bed.

4. A method of monitoring a component manufactured in an additive manufacturing system, said method comprising:
    directing electromagnetic radiation from at least one imaging device towards a build layer of the component positioned within a powder bed of the additive manufacturing system; and
    detecting by a plurality of detectors the electromagnetic radiation reflecting from the build layer, wherein each detector of the plurality of detectors is positioned at a different stationary location within the additive manufacturing system and at different angles in relation to the build layer.

5. The method in accordance with claim 4 further comprising identifying a feature within the build layer through a reflection angle of the electromagnetic radiation.

6. The method in accordance with claim 5, wherein the feature within the build layer includes at least one of a void defined within the build layer, a crack defined within the build layer, and a porosity of the build layer.

7. The method in accordance with claim 5 further comprising determining at least one of a size and a depth of the feature within the build layer.

8. An imaging device for an additive manufacturing system, said imaging device comprising a flash infrared camera and a flash lamp, said flash infrared camera configured to image infrared radiation from a build layer of a component positioned within a powder bed of the additive manufacturing system, said flash lamp configured to direct light energy towards the build layer, wherein emitted infrared radiation identifies an internal insulating feature defined within the build layer.

9. The imaging device in accordance with claim 8, wherein the internal insulating feature includes at least one of an air pocket defined within the build layer, a void defined within the build layer, and a crack defined within the build layer.

10. A method of monitoring a component manufactured in an additive manufacturing system, said method comprising:
directing light energy from a flash lamp towards a build layer of the component positioned within a powder bed of the additive manufacturing system; and
detecting, using a flash infrared camera infrared radiation emitted by the build layer.

11. The method in accordance with claim 10 further comprising identifying an internal insulating feature within the build layer through the emitted infrared radiation.

12. The method in accordance with claim 11, wherein the internal insulating feature includes at least one of an air pocket defined within the build layer, a void defined within the build layer, and a crack defined within the build layer.

13. A x-ray system for use with additively manufactured components, said x-ray system comprising:
at least one imaging device configured to direct electromagnetic radiation towards the component, said at least one imaging device individually positionable about the component; and
at least one detector configured to detect the electromagnetic radiation directed from said at least one imaging device, said at least one detector individually positionable about the component and corresponding to a position of said at least one imaging device such that a localized predetermined area of the component is imaged.

14. The x-ray system in accordance with claim 13, wherein said x-ray system is modular.

15. The x-ray system in accordance with claim 13, wherein said x-ray system is coupled to an additive manufacturing system.

16. A method of inspecting a component manufactured in an additive manufacturing system, said method comprising:
positioning a x-ray system adjacent to the component such that a localized predetermined area of the component is imaged, wherein the x-ray system includes at least one imaging device and at least one detector;
individually positioning the at least one imaging device adjacent the component;
individually positioning the at least one detector adjacent the component, the at least one detector corresponding to the at least one imaging device;
directing electromagnetic radiation from the at least one imaging device towards the component; and
detecting by the at least one detector the electromagnetic radiation from the at least one imaging device.

17. The method in accordance with claim 16 further comprising positioning at least one of the at least one imaging device and the at least one detector inside of said component.

18. The method in accordance with claim 16 further comprising identifying a feature within the component, wherein the feature includes at least one of a void defined within the component, a crack defined within the component, and a porosity of the component.

19. The additive manufacturing system in accordance with claim 1, wherein said plurality of detectors comprises a plurality of digital x-ray panels.

20. The x-ray system in accordance with claim 13, wherein said at least one imaging device comprises a plurality of imaging devices, wherein said x-ray system further comprises a positioner coupled to each imaging device of said plurality of imaging devices, and wherein said positioner individually positions each imaging device about the component.

21. The method in accordance with claim 16, wherein the at least one imaging device includes a plurality of imaging devices, wherein the x-ray system further includes a positioner coupled to each imaging device of the plurality of imaging devices, and wherein individually positioning the plurality of imaging devices adjacent the component comprises individually positioning each imaging device about the component using the positioner.

22. The imaging device in accordance with claim 8, wherein said flash lamp is configured to direct light energy towards the build layer for up to a millisecond.

23. The method in accordance with claim 11, wherein directing light energy from a flash lamp towards a build layer of the component positioned within a powder bed of the additive manufacturing system comprises directing light energy from a flash lamp towards a build layer of the component positioned within a powder bed of the additive manufacturing system for up to a millisecond.

* * * * *